United States Patent Office 3,549,614
Patented Dec. 22, 1970

3,549,614
METHOD OF MANUFACTURE OF MIXED COMPLEX COMPOUNDS OF FERRIC IRON WITH HYDROGENATED DEXTRAN AND CITRIC ACID OR SODIUM CITRATE
Jan Zbigniew Mioduszewski and Mieczyslawa Helena Mioduszewska, both of Ul. Anielewicza 33 m. 99, Warsaw, Poland, and Andrzej Januariusz Kornacki, Ul. Koscluszki 3 m. 5, Grodzisk Mazowiecki, Poland
No Drawing. Filed July 9, 1968, Ser. No. 743,301
Claims priority, application Poland, July 13, 1967, 121,668
Int. Cl. C08b 25/04
U.S. Cl. 260—209   6 Claims

ABSTRACT OF THE DISCLOSURE

Method of manufacture of a mixed complex compound of ferric iron with hydrogenated dextran and citric acid or sodium citrate, which is suitable for parenteral and enteral administration in medicine and in veterinary practice. The complex is formed by mixing precipitated, washed and filtered moist ferric hydroxide with hydrogenated dextran possession the reducing power between 0.02 and 3 (as determined by the Somogyi method), adding citric acid or sodium citrate to the mixture, making the mixture alkaline with an aqueous sodium hydroxide solution and heating with stirring until the product formed is completely soluble in water.

The subject of the invention is the method of manufacture of mixed complex compounds of ferric iron with hydrogenated dextran and citric acid or sodium citrate, which can be used in medicine and/or in veterinary practice as drugs, especially in the treatment of diseases resulting from iron deficiency in the organism, or from disturbed assimilation of iron. The drugs can be used either parenterally or enterally. These compounds were unknown until the present time. They have a number of properties that make them superior to known compounds used for similar purposes, and their preparation according to the invention is simpler and more economical.

For example, complex mixed compounds of iron with citric acid and soribtol and complexes of iron with hydrogenated dextran are known and are used in medicine.

The complexes prepared according to our invention differ from the above mentioned complexes of iron with citric acid and sorbitol, since their molecular weight is higher, and for this reason they are not so rapidly excreted via the kidneys.

The complexes prepared according to our invention contain a considerably smaller amount of combined citric acid and consequently they do not act on the clotting of the blood. On the other hand, having the molecular weight similar to that of known compounds of iron with hydrogenated dextran, which do not contain citric acid, they differ from such compounds by the ease with which they are formed in a shorter time and at lower temperatures. They are more stable during the sterilization by heat, and for a long time storage in ampoules, in which they do not form any precipitates.

Pharmacological tests showed that the complexes prepared according to the invention have a low toxicity after intravenous administration to mice ($LD_{50}$ is more than 2000 mg. per kg. body weight), and cause a high iron level in the blood plasma after intramuscular administration, which is due to good absorption of the complexes by the organism.

We have found that mixed complex compounds of ferric iron with hydrogenated dextran and citric acid or sodium citrate can be readily obtained in a good yield by mixing previously precipitated, washed, and filtered moist ferric hydroxide with dry hydrogenated dextran, adding sodium citrate or citric acid to the mixture, making the mixture alkaline with an aqueous solution of sodium hydroxide, and heating the alkaline mixture with stirring until the resulting complex becomes completely soluble in water.

The reaction takes place in a relatively wide range of temperatures from 70° C. to 100° C. The reaction rate depends on the temperature. The complex can be obtained by stirring the reaction mixture for a longer time at a lower temperature, or for a shorter time at a higher temperature. The process can be controlled by diluting samples of the reaction mixture with a large excess of water and observing the transparency of the dilute solutions. When the samples are completely transparent, it is advantageous to heat the mixture for a few minutes longer near its boiling point. After cooling, the resulting solution is filtered and is deionized in order to remove the excess of introduced alkalis and to set the pH in the physiologically advantageous region between 5.5 and 6.6.

Ferric hydroxide suitable for the preparation of the complexes according to the invention is prepared by gradual addition of aqueous sodium carbonate solution to an aqueous solution of a soluable ferric iron salt, preferably at a temperature below 20° C. The precipitated ferric hydroxide is washed with distilled water by decantation, then it is filtered or centrifuged, and while still moist it is mixed with dry powdered hydrogenated dextran in such proportions that the iron content of the product is between 5% to 30% according to requirements and destination of the preparation.

We have further found that for the preparation of complexes by the method according to the invention it is possible to use hydrogenated dextran having the reducing power between 0.02% and 3% (determined by the Samogyi method and expressed as grams of glucose equivalent per 100 g. of dextran), and having the inherent viscosity at 25° C. between 0.01 and 0.20, preferably between 0.05 and 0.07, which approximately corresponds to average weight molecular weight within the limits 3000–10,000.

Citric acid or its salt, preferably sodium salt, is used preferably in amounts from 1% to 10% of the amount of hydrogenated dextran used in the reaction.

In order to remove from the product the hydroxide of an alkali metal used in the reaction (preferably sodium hydroxide) we use according to the invention ion exchange resins, preferably weakly acidic cation exchange resins. The solution is passed through the resin placed in a column or in a filter, or the solution is mixed with the resin, which is after a certain time removed by filtration or centrifugation.

The action of the ion exchange resin is controlled by determining the pH or the electrical conductivity. It is advantageous to carry out the deionization until the pH is between 5.5 and 6.6. After filtering, the solution can be used for preparing the drug forms for injections, or the product can be isolated from the solution as a solid, conveniently in the form of a powder.

The solid product can be isolated by spray drying the solution, by evaporating the solution under reduced pressure in an apparatus normally used for similar operations, or by precipitating with a water soluble organic solvent, such as acetone or lower alcohols, filtering and drying, preferably under reduced pressure.

The product thus obtained is readily soluble in water and can be used for the preparation of fresh solutions.

An aqueous solution of the product after the deionization and filtration can be made suitable for injections by suitably adjusting the concentration of iron and by adding the suitable amount of sodium chloride in order to make the solution isotonic. The solution thus prepared is filtered, the filtrate is placed in closed vessels, such as ampoules, phials, or bottles, and is sterilized at 115° C. for 30 mins.

The method according to the invention is illustrated by the examples below, which however cannot be understood as limiting the range of the invention.

EXAMPLE 1

700 ml. of an aqueous solution of ferric chloride, containing 15 mg. of iron in 1 ml., was placed in a glass flask of 4 l. capacity fitted with a stirrer, and was cooled to 12° C. Separately 33 g. of anhydrous sodium carbonate was dissolved in 1500 ml. of water, the solution was filtered and the filtrate was cooled to 12° C. The sodium carbonate solution was added dropwise to mechanically stirred solution of ferric chloride until the pH of the suspension was 5.9. The suspension of ferric hydroxide was transferred to a larger vessel, and after diluting with water to 6 l. it was left to stand in order to allow the precipitate to settle. The supernatant liquid was decanted, and the precipitate was washed several times with distilled water until the washings were free from chlorides.

The precipitate was filtered with suction. The moist ferric hydroxide thus obtained was thoroughly mixed with 36 g. of hydrogenated dextran having the reducing power 0.020% and inherent viscosity 0.059. To the homogenous mass was added 1 g. of sodium citrate, the mass was mixed, and 2 g. of sodium hydroxide dissolved in 20 ml. of distilled water was added. The mixture was heated at 96–98° C. with constant mechanical stirring. After 45 minutes of heating a sample of the reaction mixture was completely soluble in water, and after 55 minutes the heating was stopped. After cooling, the solution was filtered through a glass filter G–3 and was passed several times through a column containing 70 ml. of weakly acidic cation exchanger Amberlite IRC–50 (manufactured by the firm Rohm and Hass). The deionization was stopped when the electrical conductivity of the solution was $1.28 \times 10^{-3}$ ohm$^{-1}$ cm.$^{-1}$, and the pH of the solution was 5.6.

The solution was diluted with distilled water so that the concentration of Fe became 50 mg./ml., and 0.85 g. of sodium chloride per 100 ml. of the solution was added. The solution was filtered through a K–5 asbestos-cellulose clearing pad, and was poured into ampoules, which were sealed and were sterilized in an autoclave at 115° C. for 30 minutes.

EXAMPLE II

Ferric hydroxide was prepared in an amount and by the method described in Example I. The complex compound was prepared by the method described in Example I. The complex compound was prepared by the method described in Example I, using 30 g. of hydrogenated dextran having the reducing power 2.8% and inherent viscosity 0.059, and introducing 1.5 g. of sodium citrate (instead of 1 g.).

The solution was deionized and filtered, and the product was isolated in the form of a dry powder by drying in a spray drier, in which the temperature of the drying air at the inlet was 130° C. The brown-red powder thus obtained contained 28.6% of iron combined in the complex compound. The product was readily soluble in water, and could be used for the preparation of solutions having the properties identical with those of the solution used in the drying process.

EXAMPLE III

Ferric hydroxide was prepared according to the method described in Example I, but using 1400 ml. of the initial ferric chloride solution containing 21.8 g. of iron. To this solution was added dropwise 2500 ml. of sodium carbonate solution containing 63 g. of anhydrous sodium carbonate until the pH of the suspension was 5.5. The precipitate was washed three times with distilled water by decantation and was filtered under reduced pressure. The moist ferric hydroxide precipitate was thoroughly mixed with 84 g. of hydrogenated dextran having the reducing power 2.32% and the inherent viscosity 0.055. To this mixture was introduced 4 g. of sodium citrate in 20 ml. of distilled water and then 24 ml. of 10% sodium hydroxide solution. The mixture was heated with constant stirring during 25 minutes until its temperature reached 75° C. and it was maintained at this temperature for 15 minutes. Then the temperature of the mixture was gradually increased, so that after 25 minutes it was 95° C. At this temperature the product was completely soluble in water. The mixture was further heated at 98° C. for 15 minutes and it was allowed to cool.

After filtering, the solution was deionized by passing it several times (4 times) through 90 ml. of Amberlite IRC–50 suspension until its pH became 6.0. Then the solution was transformed to the form suitable for injections and was sterilized according to the method described in Example I.

We claim:
1. Method of manufacture of a mixed complex compound of ferric iron with hydrogenated dextran and a material selected from the group consisting of citric acid and its sodium salt, which complex compound is non-ionic, soluble in water, and suitable for parenteral and enteral administration in medicine and in veterinary practice, in which a precipitated washed and filtered moist ferric hydroxide is mixed with dry hydrogenated dextran having the reducing power between 0.02 and 3 as determined by the Somogyi method and expressed as the number of grams of glucose equivalent in 100 g. of said hydrogenated dextran, and with a material selected from the group consisting of citric acid and sodium citrate, until a homogeneous paste is obtained, making said paste alkaline with an aqueous hydroxide solution and heating with stirring until the resulting complex product becomes completely soluble in water.

2. The method according to claim 1 in which said material is in the form of an aqueous solution.

3. The method according to claim 1 in which said material is sodium citrate.

4. The method according to claim 1 in which said heating is at 70° C. to 100° C.

5. The method according to claim 1 in which said mixed complex compounds are cooled following said heating and stirring, filtered and deionized in order to remove the excess of sodium hydroxide.

6. Mixed compounds prepared in accordance with the method of claim 1.

References Cited

UNITED STATES PATENTS 3,000,872  9/1961  Novak _____ 260—209D
3,234,209  2/1966  Floramo _____ 260—209D LEWIS GOTTS, Primary Examiner J. R. BROWN, Assistant Examiner U.S. Cl. X.R.
424—180